(12) United States Patent
Kadashevich et al.

(10) Patent No.: US 8,392,508 B2
(45) Date of Patent: Mar. 5, 2013

(54) SELECTIVELY CONTROLLING INFORMATION FLOW IN A COLLABORATIVE ENVIRONMENT

(75) Inventors: A. Julie Kadashevich, Tyngsboro, MA (US); Jane B. Marcus, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 12/813,644

(22) Filed: Jun. 11, 2010

(65) Prior Publication Data

US 2011/0307557 A1 Dec. 15, 2011

(51) Int. Cl.
*G06F 15/16* (2006.01)

(52) U.S. Cl. ......... 709/205; 709/204; 709/206; 455/415

(58) Field of Classification Search .................... 709/205
See application file for complete search history.

(56) References Cited

U.S. PATENT DOCUMENTS

| | | | |
|---|---|---|---|
| 7,426,557 B2 | 9/2008 | Gruhl et al. | |
| 7,437,408 B2 | 10/2008 | Schwartz et al. | |
| 7,519,672 B2* | 4/2009 | Boss et al. | 709/206 |
| 7,630,986 B1 | 12/2009 | Herz et al. | |
| 2004/0177119 A1* | 9/2004 | Mason et al. | 709/206 |
| 2005/0064854 A1* | 3/2005 | Jang | 455/415 |
| 2005/0198127 A1* | 9/2005 | Helland et al. | 709/204 |
| 2006/0248573 A1 | 11/2006 | Pannu et al. | |
| 2007/0073821 A1 | 3/2007 | Brail | |
| 2007/0106551 A1 | 5/2007 | McGucken | |
| 2008/0021955 A1 | 1/2008 | Stallings | |
| 2009/0089380 A1 | 4/2009 | Wang et al. | |
| 2009/0216620 A1 | 8/2009 | Lee | |
| 2009/0282144 A1 | 11/2009 | Sherrets et al. | |
| 2010/0057863 A1 | 3/2010 | Allen et al. | |
| 2010/0281122 A1* | 11/2010 | Li et al. | 709/206 |

FOREIGN PATENT DOCUMENTS

WO  2009138755 A1  11/2009

OTHER PUBLICATIONS

Blosser et al.; "Privacy Preserving Collaborative Social Network", ISA International Conference on, 2008, pp. 543-548.
Cutillo et al.; "Privacy Preserving Social Networking Through Decentralization", WONS Sixth International Conference on, 2009, pp. 145-152.

* cited by examiner

*Primary Examiner* — Hua Fan
(74) *Attorney, Agent, or Firm* — Steven L. Nichols; Van Cott, Bagley, Cornwall & McCarthy P.C.

(57) ABSTRACT

Selectively controlling information flow in a collaborative environment implemented by at least one server device includes: receiving in the at least one server device, from a first user of the collaborative environment, a pipeline condition corresponding to a target recipient and a release condition corresponding to the target recipient; and preventing the target recipient, with the at least one server device, from accessing information satisfying the pipeline condition posted by the first user to the collaborative environment until the release condition has been satisfied.

26 Claims, 7 Drawing Sheets

SELECTIVELY CONTROLLING INFORMATION FLOW IN A COLLABORATIVE ENVIRONMENT

BACKGROUND

Aspects of the present invention relate to server-implemented collaborative environments through which users exchange information. More specifically, aspects of the present invention relate to selectively controlling the flow of information in a collaborative environment.

In a collaborative environment, members of the environment are able interact with each other through mutual access to a software services. Examples of software services implemented by collaborative environments include email platforms, instant messaging platforms, file sharing platforms, blogging platforms, online meeting platforms, collaborative document editing platforms, calendaring platforms, social networking platforms, and the like.

Collaborative environments often allow one member of the environment to post information to a software service, which then disseminates or otherwise makes the information available to other members of the environment within a network of the posting member. For example, a collaborative environment may implement an email listserv such that any email sent to the listserv is forwarded to all subscribers of that listserv. In another example, a collaborative environment may implement a social network service such that information posted by a user to the social network service is visible to all members of the social network service within the network of that user.

Many collaborative environments rely heavily on the concept of enabling information exchange among a network of trusted contacts. One consequence of this characteristic is the fact that often information posted by a user will be visible to that user's entire network of trusted contacts in the collaborative environment, even if the user would prefer that the information not be immediately available to all members of the user's entire network.

BRIEF SUMMARY

A method of selectively controlling information flow in a collaborative environment implemented by at least one server device includes: receiving in the at least one server device, from a first user of the collaborative environment, a pipeline condition corresponding to a target recipient and a release condition corresponding to the target recipient; and preventing the target recipient, with the at least one server device, from accessing information satisfying the pipeline condition posted by the first user to the collaborative environment until the release condition has been satisfied.

A method of selectively controlling information flow in a collaborative environment implemented by at least one server device includes: receiving information posted by a first user in the at least one server device of the collaborative environment; determining with the at least one server device that a pipeline condition enforced by the collaborative environment temporarily disallows a target recipient from accessing the information; and storing the information with the at least one server device in a queue without delivering the information to the target recipient until a release condition corresponding to the queue has been satisfied.

A system includes a processor and a memory communicatively coupled to the processor. The memory has executable code stored thereon such that the processor, upon executing the executable code, is configured to: receive from a first user of the collaborative environment a pipeline condition corresponding to a target recipient and a release condition corresponding to the target recipient; and prevent the target recipient from accessing information satisfying the pipeline condition posted by the first user to the collaborative environment until the release condition has been satisfied.

A computer program product for interfacing with a user through an operating system includes a computer readable storage medium having computer readable program code embodied therewith. The computer readable program code includes: computer readable program code configured to receive from a first user of the collaborative environment a pipeline condition corresponding to a target recipient and a release condition corresponding to the target recipient; and computer readable program code configured to prevent the target recipient from accessing information satisfying the pipeline condition posted by the first user to the collaborative environment until the release condition has been satisfied.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
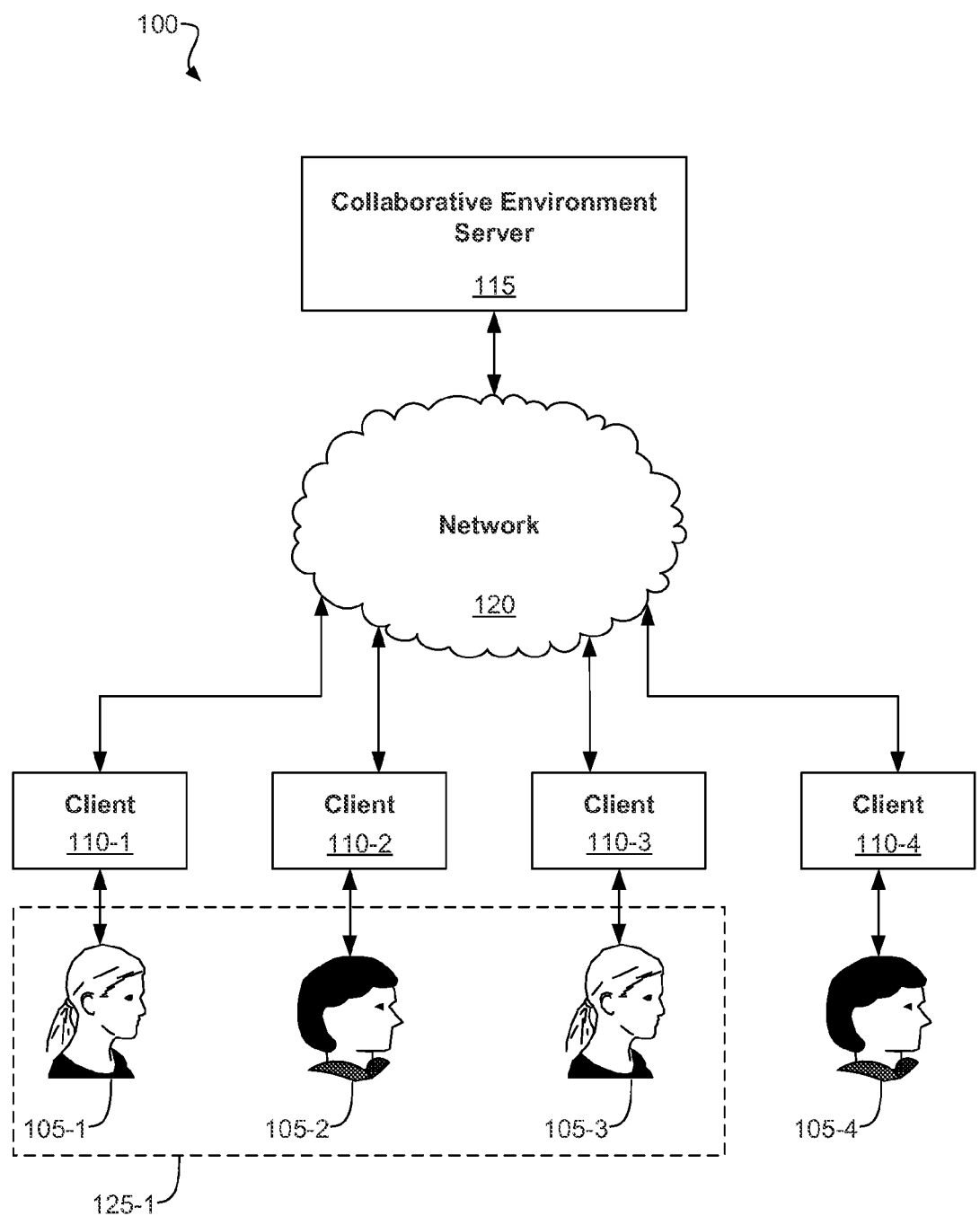
FIG. 1 is a block diagram of an illustrative collaborative environment system, according to one exemplary embodiment of principles described herein.

The present specification discloses methods and systems for controlling information flow in a collaborative environment. Specifically, the methods and systems of the present specification allow a user to designate another user or group of users in the collaborative environment to create a pipeline of information such that information posted by the user to the collaborative environment matching a pipeline condition will be temporarily withheld from the designated user or group of users until a release condition has been satisfied.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used in the present specification and in the appended claims, the term "collaborative environment" refers to a software-implemented environment in which information posted by a user of the environment is made available to multiple other users of the environment.

As used in the present specification and in the appended claims, the term "message" refers broadly to an autonomous communication from a first party to at least a second party. Examples of messages in a collaborative environment context include, but are not limited to, email or other direct communications, information posted to a social network, collaborative calendar events, instant messages, blog posts, Really Simple Syndication (RSS) feed elements, and the like. A message need not specify an intended recipient. Rather, as with the example of a social network status update, the recipients of a message may be inherent in the circumstances under which the message is sent.

With reference now to FIG. 1, a block diagram is shown of an illustrative collaborative environment system (100). In the system (100), each user (105-1 to 105-4) in a plurality of users (105-1 to 105-4) is associated with a respective client device (110-1 to 110-4). Each client device (110-1 to 110-4) is communicatively coupled to a collaborative environment server (115) through a computer network (120).

Software executed by the collaborative environment server (115) and the client devices (110-1 to 110-4) implement a collaborative environment that enables communication among the users (105-1 to 105-4). The collaborative environment may include, for example, an email platform that allows the users (105-1 to 105-4) to send email messages to each other individually and realize electronic mailing list (e.g., LISTSERV) functionality. Additionally or alternatively, the collaborative environment may include a social networking platform, an interactive calendaring platform, an instant messaging platform, a collaborative document editing platform, an interactive meeting platform, a video/voice chat platform, and any other collaborative platform that may be suitable to a particular application of the principles described herein.

In certain embodiments, the collaborative environment may allow for the creation of groups (125) among the users (105-1 to 105-4) such that users (105-1 to 105-3) that are members of the same group (125) have more access to each other's information than users (105-4) that are not members of the same group (125). For example, information posted by a user (105-1) to the collaborative environment may by default be made available to other members of the group(s) (125) to which that user (105-1) belongs within the collaborative environment, whereas a user (105-4) that does not share a group with the posting user (105-1) may not have access to the posted information.

An example of this type of group is an email list, where any member of the email list may send an email to the list that is then forwarded to all other members of the email list. Another example of this type of group is a social network in which a status update posted by a member of the social network is only visible to designated "friends" of the posting user.

Figure 2:
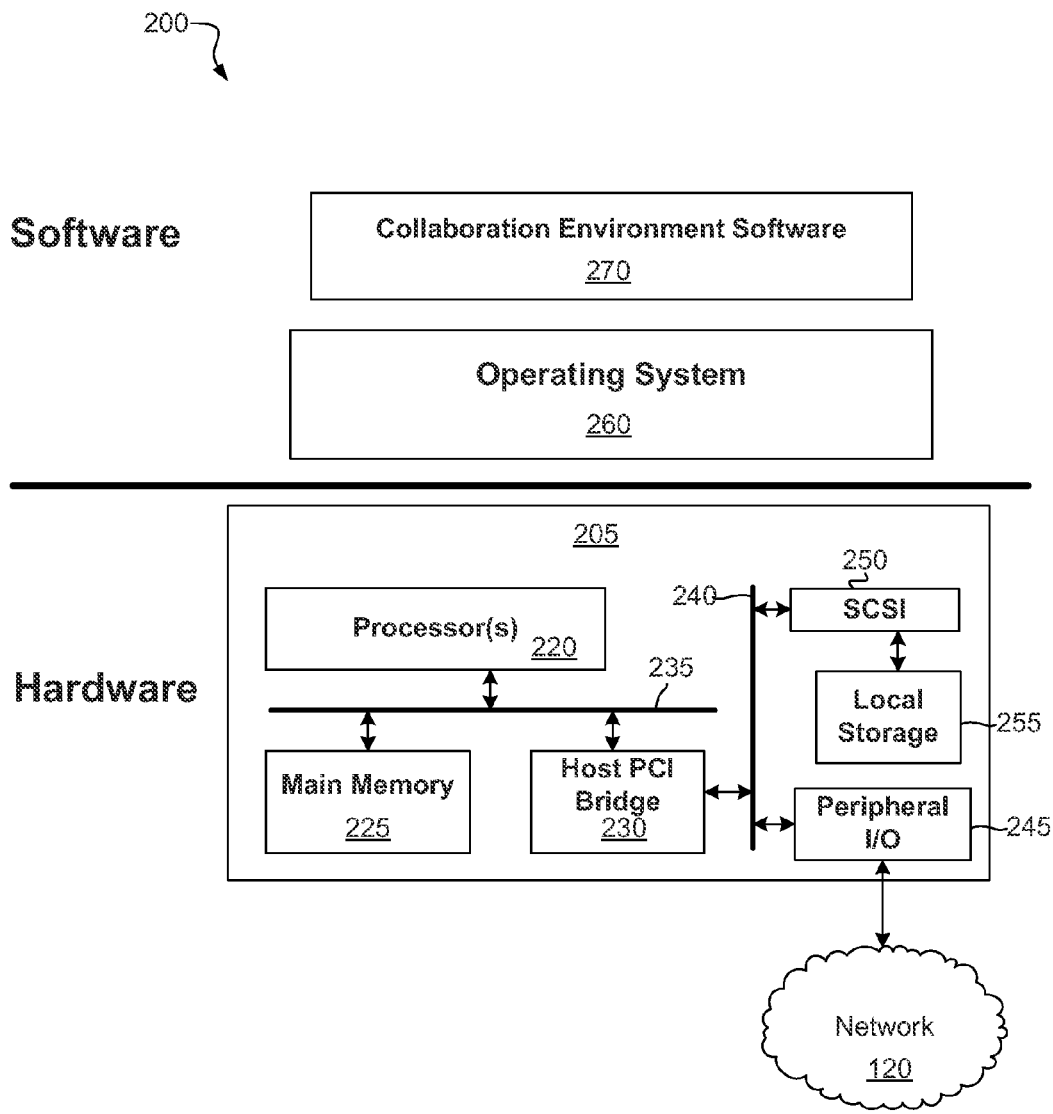
FIG. 2 is a block diagram of an illustrative computing device for use in a collaborative environment, according to one exemplary embodiment of principles described herein.

With reference now to FIG. 2, a block diagram is shown of an illustrative computing device (200) that may be used to execute collaborative environment software in either a collaborative environment server (115, FIG. 1) or a client device (110-1 to 110-4, FIG. 1) to implement a collaborative environment.

The hardware platform (205) of the computing device (200) may include at least one processor (220) that executes code stored in the main memory (225). In certain embodiments, the processor (220) may be a multi-core processor having multiple independent central processing units (CPUs), with each CPU having its own L1 cache and all CPUs sharing a common bus interface and L2 cache. Alternatively, the processor (220) may be a single-core processor.

The at least one processor (220) may be communicatively coupled to the main memory (225) of the hardware platform and a host peripheral control interface bridge (PCI) (230) through a main bus (235). The main memory (225) may include dynamic non-volatile memory, such as random access memory (RAM). The main memory (225) may store executable code and data that is obtainable by the processor (220) through the main bus (235).

The host PCI bridge (230) may act as an interface between the main bus (235) and a peripheral bus (240) used to communicate with peripheral I/O devices (245). Among these peripheral devices may be a network interface configured to communicate with an external network (120), external human interface devices (e.g., monitor, keyboard, mouse, touch screen, speaker, microphone), other external devices (e.g., external storage, dongles, specialized tools), serial buses (e.g., Universal Serial Bus (USB)), and the like. A Small Computer System Interface (SCSI) (250) for communicating with local storage devices (255) may also communicate with the peripheral bus (240).

It will be readily apparent to those having skill in the art that the present configuration of the hardware platform (205) is merely illustrative of one type of hardware platform (205) that may be used in connection with the principles described in the present specification. Moreover, it will be further apparent that various modifications, additions, and deletions to the hardware platform (205) shown are conceivable and anticipated by the present specification.

The hardware platform (205) shown in the lower half of the diagram of FIG. 2 is configured to implement the elements of software functionality shown in the upper half of the diagram of FIG. 2. Thus, as shown in FIG. 2, an operating system (202) program is executed directly by the hardware platform (205). The operating system (202) may interact with and manage the performance of hardware resources in the hardware platform (205), including the processor(s) (220), the main memory (225), and the peripheral devices. Thus, the operating system (260) controls the execution of computer programs by the processor(s) (212). Among these computer programs may include collaboration environment software (270). The collaboration environment software (270) may include collaboration environment server software and/or collaboration environment client device software, depending on the role of the computing device (200) in the collaboration environment.

Figure 3:
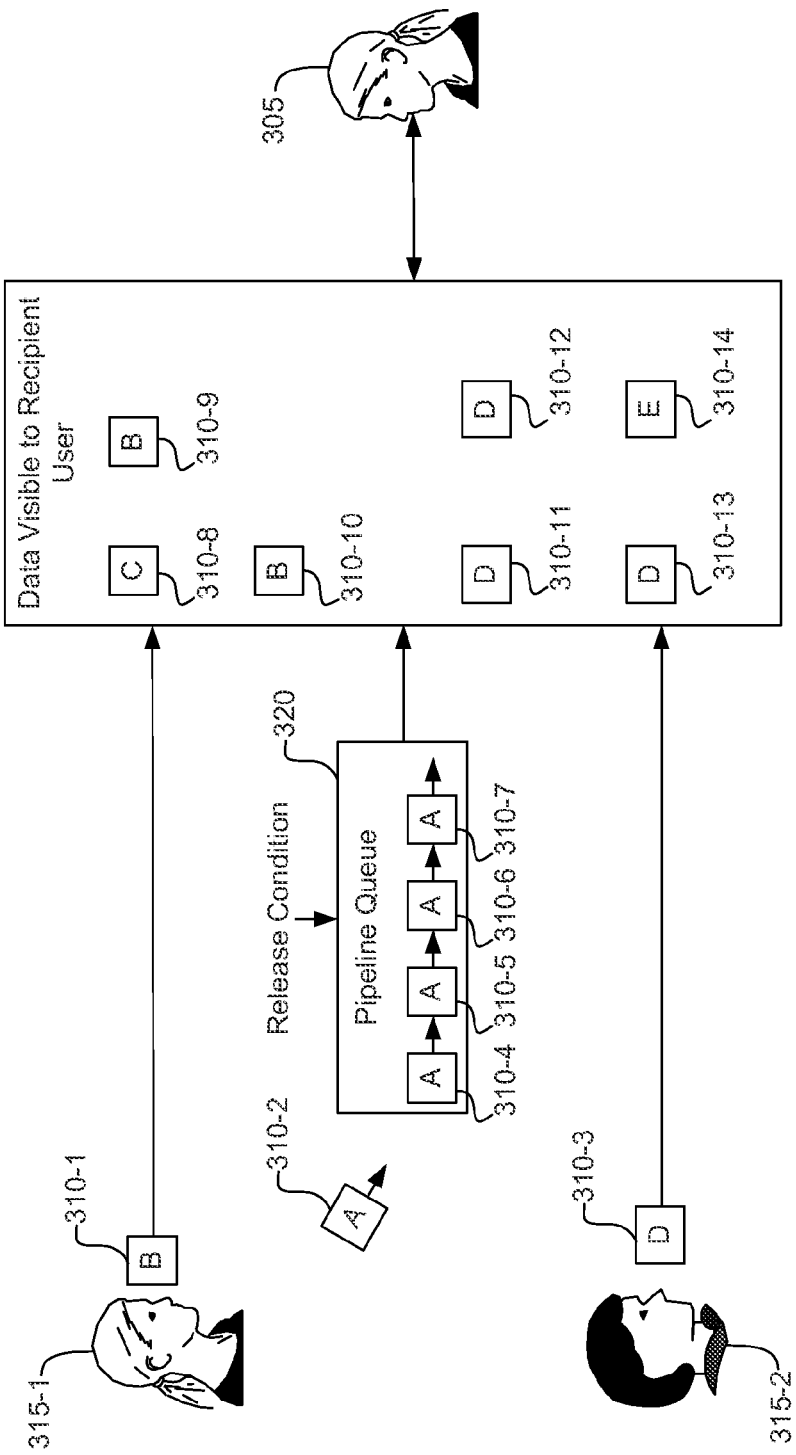
FIG. 3 is a diagram of an illustrative posting of information to a collaborative environment, according to one exemplary embodiment of principles described herein.

Referring now to FIG. 3, a diagram is shown of an illustrative pipelining function implemented in a collaboration environment. In the collaborative environment, a recipient user (305) has permission to view all information (310-1 to 310-14) posted to the collaborative environment by posting users (315-1, 315-2). However, one or more of the posting users (315-1, 315-2) may desire to establish a pipeline condition such that information satisfying the pipeline condition is temporarily withheld from that particular recipient user (305) until a release condition is satisfied. Thus, in the present example, a pipeline condition has been established by the first posting user (315-1) such that any information posted by the first posting user (315-1) having a topic of "A" satisfies the pipeline condition. Thus, all information (310-2, 310-4, 310-5, 310-6, 310-7) posted by the first posting user (315-1) to the collaborative environment having the topic of "A" is not visible to the designated recipient user (305) until a specified release condition has been satisfied. Rather, the information (310-2, 310-4, 310-5, 310-6, 310-7) satisfying the pipeline condition is stored in a pipeline queue (320) in the order it was originally posted by the first posting user (315-1). Then, when the specified release condition has been satisfied, the withheld information (310-2, 310-4, 310-5, 310-6, 310-7) is released from the queue (320) the recipient user (305) will have access to all of the withheld information (310-2, 310-4, 310-5, 310-6, 310-7) in the order that the withheld information (310-2, 310-4, 310-5, 310-6, 310-7) was originally posted to the collaborative environment.

In certain examples, the collaborative environment may automatically detect that the release condition has been satisfied. Additionally or alternatively, a user or external process may notify the collaborative environment that the release condition has been satisfied to trigger releasing the withheld information from the queue (320).

The pipeline condition enforced by the collaborative environment does not affect information (310-1) posted by the first posting user (315-1) having a topic other than "A" or information (310-3) posted by the second posting user (315-2) because such information does not satisfy the pipeline condition. Information (310-1, 310-3) posted to the collaborative environment that does not satisfy the pipeline condition will be immediately visible to the recipient user (305) provided that the recipient user (305) has the correct level of permission to view the information (310-1, 310-3). Moreover, information that is withheld from the recipient user (305) in the pipeline queue (320) will still be timely delivered to any other designated recipients of that information provided that separate pipeline queue applies to those designated recipients.

For the sake of clarity, the principles of FIG. 3 will now be illustrated in the context of two separate scenarios. In the first exemplary scenario, the instances of information (310-1 to 310-14) posted to the collaborative environment are email messages sent to a group email list to which the recipient user (305) subscribes. The first posting user (315-1) is a software developer working on a product for which version 1.0 is about to be released. The email list is dedicated to the product and includes developers and sales representatives. The recipient user (305) is a sales representative attempting to learn about all of the features of version 1.0 of the product. However, the first posting user (315-1) is already be thinking about the features of the next release of the product—release 1.5—and desires to share some of her thoughts with other developers on the mailing list. To avoid confusing the sales representative recipient user (305), the first posting user (315-1) may set a pipeline condition in the email system such that all email messages sent by the first posting user (315-1) that reference version 1.5 of the product will be temporarily withheld from the sales representative recipient user (305) in the pipeline queue (320) until version 1.0 has been released. At that point, all of the emails sent by the first posting user (315-1) to the mailing list referencing version 1.5 of the product will then be sent to the sales representative recipient user (305) in their original order. In certain examples, the email system may also withhold in the pipeline queue (320) any messages sent to the mailing list by other posting users (315-2) that reference or reply to the emails sent by the first posting user (315) regarding version 1.5 of the product, in order to preserve context for the recipient user (305).

In a second exemplary scenario the collaborative environment may be a social networking service where users (315-1, 315-2) can post text, photos, links, and other information that is then viewable by other users of the social networking service. Again, supposing that the first posting user (310-1) is a software developer working on a product for which version 1.0 is about to be released and that the recipient user (305) is a marketing representative, the first posting user (310-1) may prefer to withhold information about the release of version 1.5 from the marketing representative recipient user (305) until version 1.0 has already been released. Thus, the first posting user (315-1) may set a pipeline condition in the social networking service such that all status updates to the social networking service by the first posting user (315-1) that reference version 1.5 of the product will be temporarily withheld from the sales representative recipient user (305) in the pipeline queue (320) until version 1.0 has been released. At that point, all of the status updates posted by the first posting user (315-1) to the social networking service referencing version 1.5 of the product will then be made visible to the sales representative recipient user (305) in their original order. In certain examples, the social networking service may also withhold in the pipeline queue (320) any comments on or replies to the status updates posted by the first posting user (315) regarding version 1.5 of the product.

It should be understood that while the present example is described with respect to a pipeline condition based on the topic associated with posted information and the user originating the information, any other pipeline condition can be used that may suit a particular application of these principles. Furthermore, any release condition can be used that may suit a particular application of these principles.

Figure 4:
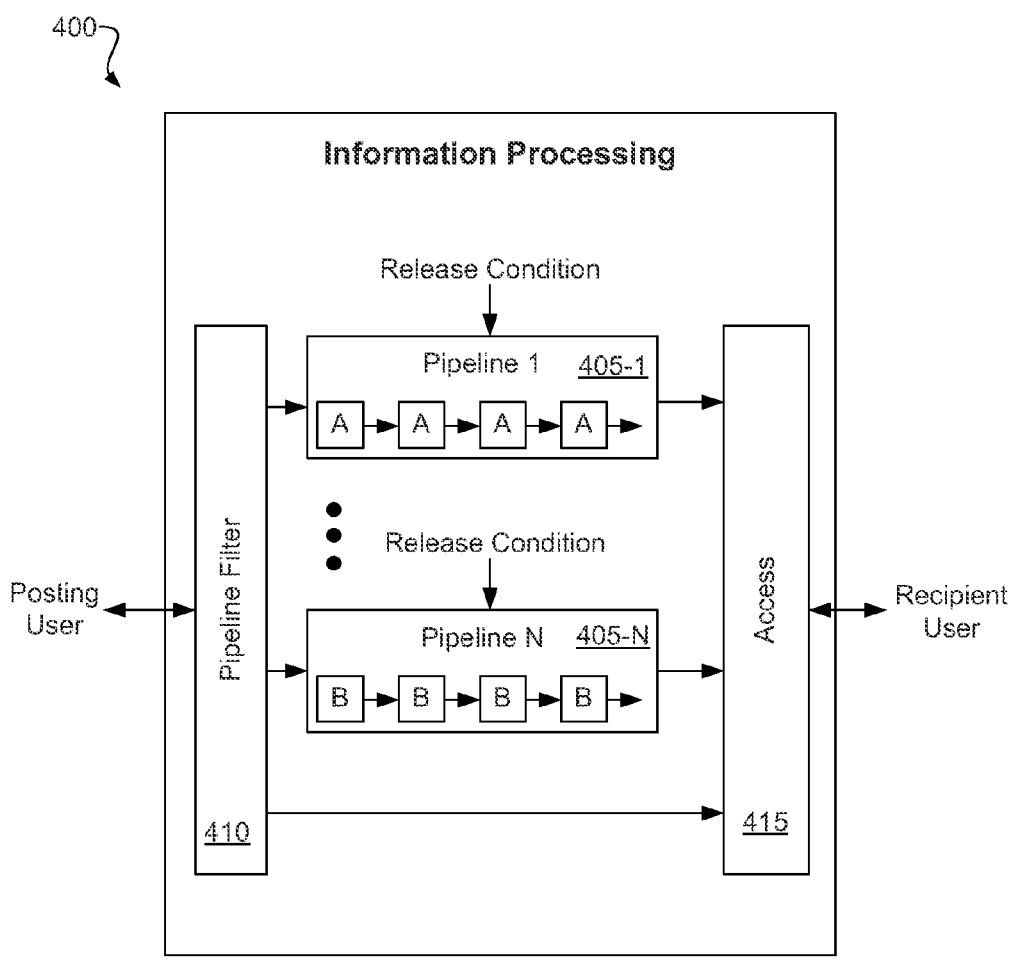
FIG. 4 is a block diagram of an illustrative information processing module implemented by an illustrative collaborative environment, according to one exemplary embodiment of principles described herein.

Referring to FIG. 4, a block diagram of an illustrative information processing module (400) in an illustrative collaborative environment is shown. The information processing module (400) may implement one or more pipeline queues (405-1 to 405-N), each pipeline queue having an associated pipeline condition and release condition according to the principles described above. Information posted by a user to the collaborative environment may be received be the information processing module (400), where a pipeline filter (410) determines whether the received information satisfies a pipeline condition associated with any of the pipeline queues (405-1 to 405-N) currently implemented by the collaborative environment. If so, the information is routed to the appropriate pipeline queue(s) (405-1 to 405-N) and access will be given to the recipient(s) designated by the pipeline queue(s) (405-1 to 405-N) through an access block (415) only after the appropriate release condition(s) have been satisfied. Of course, the access block (415) will make the same information immediately available to any designated recipient not subject to pipeline withholding. Furthermore, any information determined to not satisfy any pipeline condition enforced by the collaborative environment will also be immediately made available to its designated recipient user(s) through the access block (415).

Figure 5:
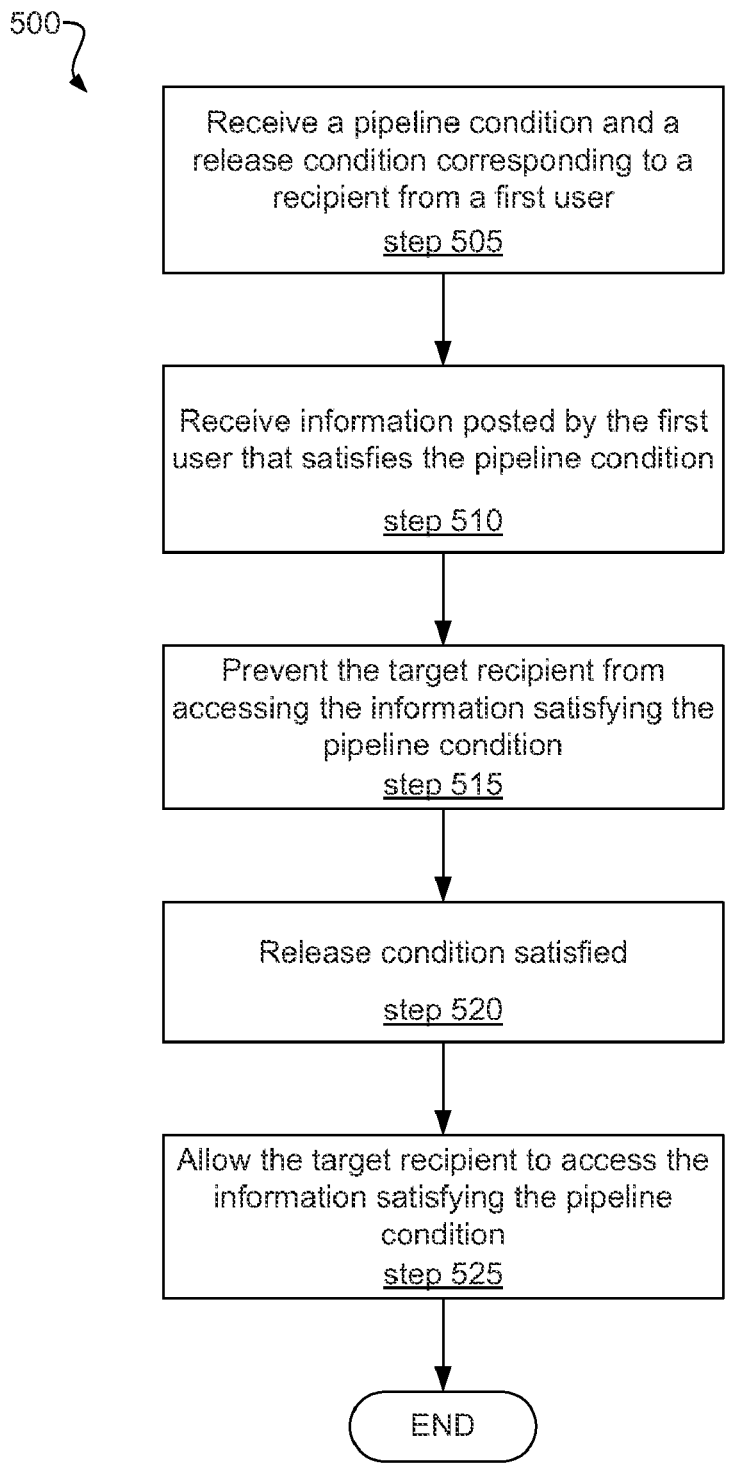
FIG. 5 is a flowchart diagram of an illustrative method of selectively controlling information flow in a collaborative environment, according to one exemplary embodiment of principles described herein.
Figure 6:
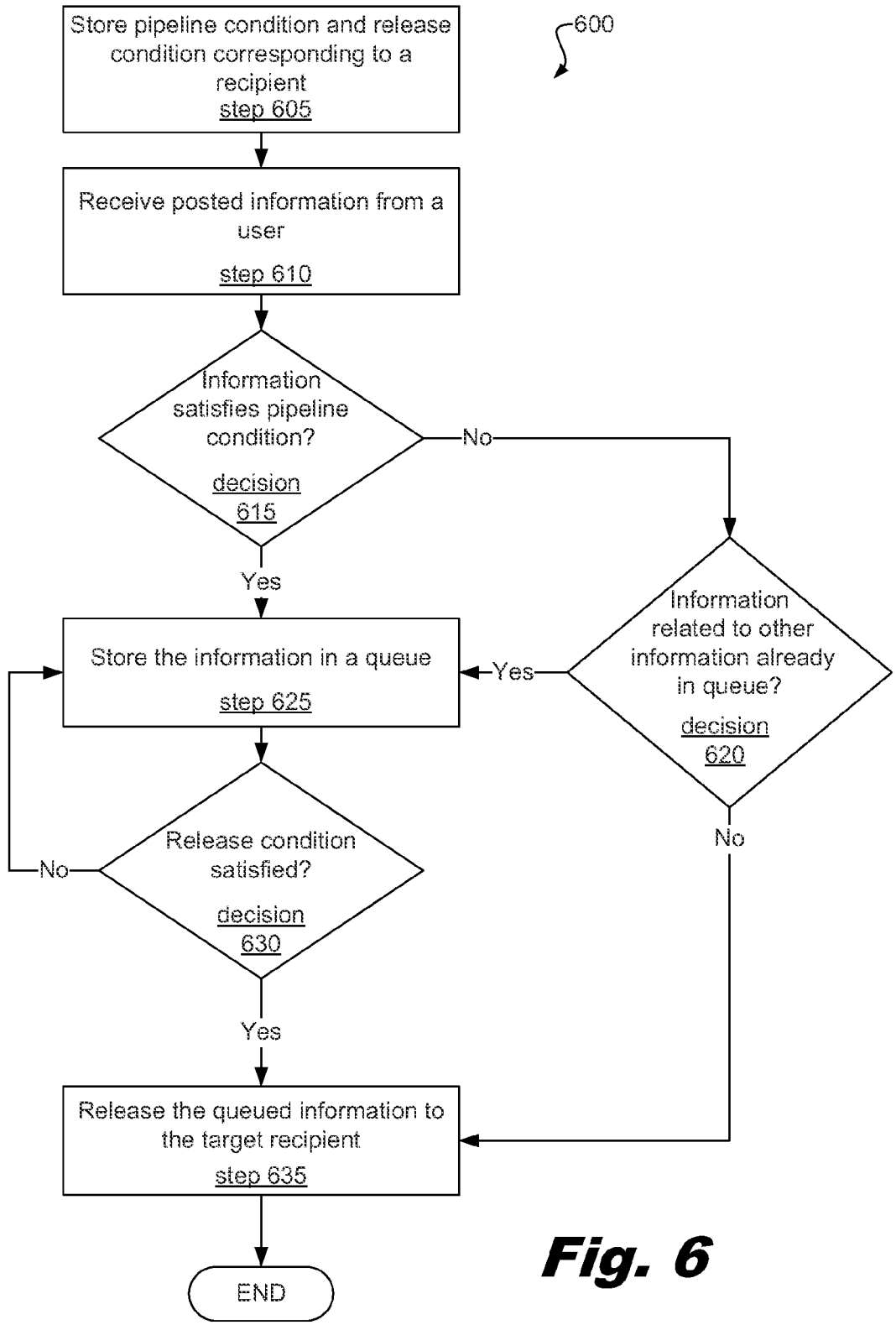
FIG. 6 is a flowchart diagram of an illustrative method of selectively controlling information flow in a collaborative environment, according to one exemplary embodiment of principles described herein.
Figure 7:
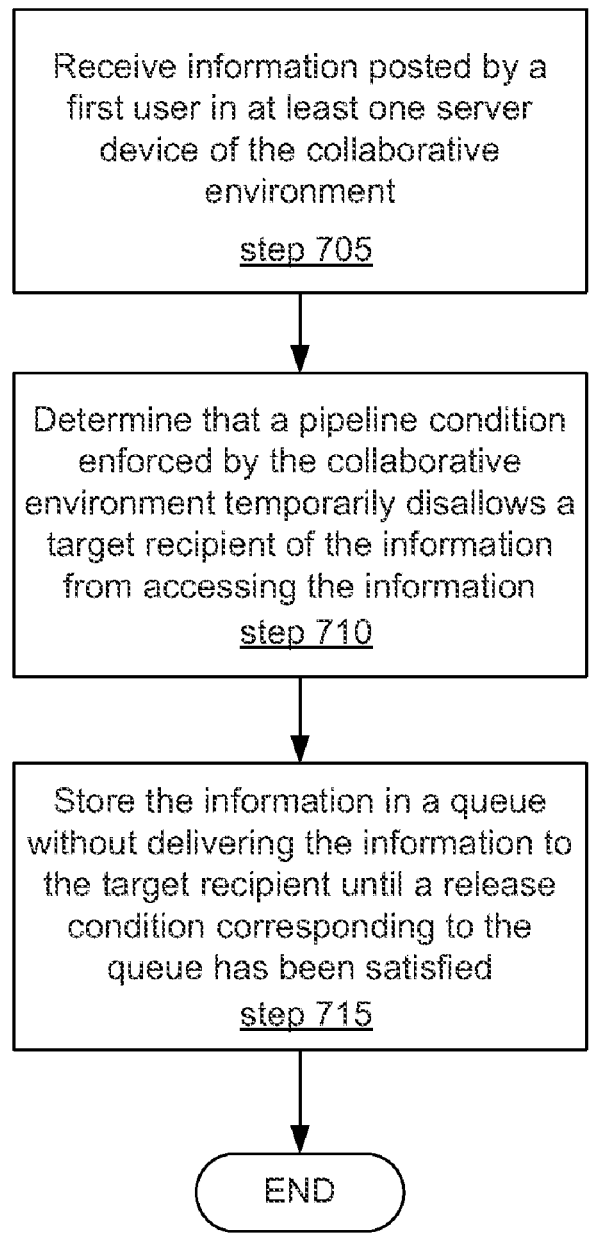
FIG. 7 is a flowchart diagram of an illustrative method of selectively controlling information flow in a collaborative environment, according to one exemplary embodiment of principles described herein.

Referring now to FIGS. 5, 6 and 7, flowchart diagrams are shown of illustrative methods (500, 600, 700) of selectively controlling information flow in a collaborative environment. The collaborative environment may be implemented by at least one server device, as described above with respect to FIGS. 1 and 2.

Referring specifically to FIG. 5, a pipeline condition and a release condition are first received (step 505) in the collaborative environment from a first user. The pipeline condition and the release condition correspond to at least one target recipient. The collaborative environment receives (step 510) information posted by the first user that satisfies the pipeline condition and prevents (step 515) the target recipient from accessing the information until the specified release condition is satisfied (step 520), after which the collaborative environment allows (step 525) the target recipient to access the information satisfying the pipeline condition.

In certain examples, the first user may specify different constraints for different types of information that satisfy the pipeline condition. Thus, an event invitation satisfying the pipeline condition may be treated differently from a blog posting that also satisfies the pipeline condition. For instance, a user may specify that a withheld event invitation should not be delivered to the target recipient at all if the release condition is satisfied after the date and time for which the event was scheduled. Alternatively, the user may specify that a withheld event invitation be processed to, for example, remove obsolete information prior to releasing the information to the target recipient. In this way, the target recipient may be less likely to detect that the released information was previously withheld.

In certain examples, the release condition associated with a pipeline condition may expire after a period such that information is withheld information from the target recipient for no longer than a predetermined maximum amount of time.

In certain examples, a collaborative environment may enforce one or more pipeline conditions that have no associated release condition such that information matching the pipeline condition is withheld indefinitely from the target recipient(s). For example, the first user may set a pipeline condition that is satisfied by information posted by the first user about the first user's search for new employment, where the first user's supervisor is the target recipient. This pipeline condition may have no associated release condition, and therefore the collaborative environment would indefinitely withhold information from the user's supervisor related to the user seeking new employment.

In certain examples, a collaborative environment may also withhold information posted by other users of the collaborative environment from the target recipient, where the information posted by the other users is related to withheld information posted by the first user that satisfies the pipeline condition. This additional withholding of information may occur to provide context to the target recipient, even though the information posted by the other users does not directly satisfy the pipeline condition. The collaborative environment may detect third party information that is related to the withheld information of the first user through the threading of messages and/or through semantic analysis of information posted.

Referring now to FIG. 6, a flowchart diagram is shown of a more detailed illustrative method (600) of selectively controlling information flow in a collaborative environment. The method (600) begins by the collaborative environment storing (step 605) a pipeline condition and a release condition corresponding to a recipient. The pipeline condition and the release condition may be received from a user of the collaborative environment. The collaborative environment then receives (step 610) information posted to the collaborative environment by a user—the newly posted information being such that the target recipient would normally have access to the information. The user posting the information may be the same user that provided the pipeline condition and the release condition, or a different user. The information posted to the collaborative environment may be an email message to a group list, a social networking status update, a blog post, an RSS feed item, a calendaring event, and/or any other information that may be posted to a collaborative environment.

The collaborative environment then determines (decision 615) whether the information satisfies the received pipeline condition. If so (decision 615, Yes), the information is stored (step 625) in a queue until the collaborative environment determines (decision 630, Yes) that the release condition has been satisfied. The queue may be, for example, a FIFO queue or a LIFO queue that preserves the order in which the stored information was originally posted to the collaborative environment. Of course, other users in addition to the target recipient may have immediate access to the posted information prior to the release condition being satisfied.

If the information does not satisfy the pipeline condition (decision 615, No), a determination is made as to whether (decision 620) the information is related to other information already in the queue. For example, the collaborative environment may determine that information posted by a second user as a reply to information posted by a first user that is already stored in the queue. Additionally or alternatively, the collaborative environment may determine information posted by a second user to the collaborative environment shares an organizational thread with information satisfying the pipeline condition posted by the first user and stored in the queue, and is therefore related to the queued information posted by the first user. Additionally or alternatively, the collaborative environment may perform a semantic analysis on information posted by a second party to the collaborative environment to determine that the information posted by the second party is related to information posted by a first party that is already stored in the queue.

If the newly posted information is related to other information already in the queue (decision 620, Yes), the newly posted information is still stored in the queue (step 625) until the release condition is satisfied (decision 630). Otherwise (decision 620, No), the newly posted information is immediately made available to the recipient.

Once the collaborative environment determines (decision 630, Yes) that the release condition has been satisfied, all of the information in the queue is released (step 635) to the recipient (e.g., the recipient is granted access to the information or the information is transmitted to the recipient), preferably in the order that the information was received into the queue.

Referring now to FIG. 7, a flowchart diagram is shown of another illustrative method (700) of selectively controlling information flow in a collaborative environment. In this method (700), information posted by a first user is received (step 705) in at least one server device of the collaborative environment. The server determines (step 710) that a pipeline condition enforced by the collaborative environment temporarily disallows a target recipient of the information from accessing the information and stores (step 715) the information in a queue without delivering the information to the target recipient until a release condition corresponding to the queue has been satisfied.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of selectively controlling information flow in a collaborative environment implemented by at least one server device, said method comprising:

receiving in said at least one server device, from a first user of said collaborative environment, a pipeline condition corresponding to a target recipient and a release condition corresponding to said target recipient;

preventing said target recipient, with said at least one server device, from accessing information satisfying said pipeline condition posted by said first user to said collaborative environment until said release condition has been satisfied; and allowing users of said collaborative environment other than said target recipient to access said information satisfying said pipeline condition posted by said first user to said collaborative environment prior to said release condition being satisfied.

2. The method of claim 1, further comprising storing said information satisfying said pipeline condition posted by said first user to said collaborative environment in a queue preserving an order in which said information is posted by said first user to said collaborative environment.

3. The method of claim 2, further comprising releasing said information satisfying said pipeline condition posted by said first user to said collaborative environment from said queue to said target recipient in the same order that said information was posted by said first user to said collaborative environment when said release condition has been satisfied.

4. A method of selectively controlling information flow in a collaborative environment implemented by at least one server device, said method comprising:

receiving in said at least one server device, from a first user of said collaborative environment, a pipeline condition corresponding to a target recipient and a release condition corresponding to said target recipient;

preventing said target recipient, with said at least one server device, from accessing information satisfying said pipeline condition posted by said first user to said collaborative environment until said release condition has been satisfied; and determining that information posted by a second user to said collaborative environment references said information satisfying said pipeline condition posted by said first user to said collaborative environment; and preventing said target recipient from accessing said information posted by said second user to said collaborative environment until said release condition has been satisfied.

5. The method of claim 4, wherein said determining that information posted by said second user to said collaborative environment references said information satisfying said pipeline condition posted by said first user to said collaborative environment comprises:

determining that said information posted by said second user to said collaborative environment is a reply to said information satisfying said pipeline condition posted by said first user to said collaborative environment.

6. The method of claim 4, wherein said determining that information posted by said second user to said collaborative environment references said information satisfying said pipeline condition posted by said first user to said collaborative environment comprises:

determining that said information posted by said second user to said collaborative environment shares an organizational thread with said information satisfying said pipeline condition posted by said first user to said collaborative environment.

7. The method of claim 4, wherein said determining that information posted by said second user to said collaborative environment references said information satisfying said pipeline condition posted by said first user to said collaborative environment comprises:

performing a semantic analysis of said information posted by said second user to said collaborative environment; and determining from said semantic analysis that said information posted by said second user to said collaborative environment is substantially related to said information satisfying said pipeline condition posted by said first user to said collaborative environment.

8. The method of claim 1, further comprising subjecting said release condition to an expiration such that said second user receives access to said information satisfying said pipeline condition posted by said first user to said collaborative environment if said release condition has not been satisfied after a predetermined amount of time.

9. The method of claim 1, wherein said collaborative environment comprises a social networking service and said information posted by said first user comprises a post to said social networking service.

10. The method of claim 1, wherein said collaborative environment comprises an email service and said information posted by said first user comprises an email message sent to a plurality of recipients.

11. The method of claim 1, wherein said collaborative environment comprises a calendaring system and said information posted by said first user comprises an invitation to an event.

12. A method of selectively controlling information flow in a collaborative environment implemented by at least one server device, said method comprising:

receiving information posted by a first user in said at least one server device of said collaborative environment;

determining with said at least one server device that a pipeline condition enforced by said collaborative environment temporarily disallows a target recipient of said information from accessing said information;

delivering said information to any designated recipient of said information other than said target recipient prior to said release condition being satisfied; and storing said information with said at least one server device in a queue without delivering said information to said target recipient until a release condition corresponding to said queue has been satisfied.

13. The method of claim 12, further comprising releasing said information from said queue and delivering said information to said target recipient when said release condition has been satisfied.

14. The method of claim 12, further comprising subjecting said release condition to an expiration such that said information is delivered to said target recipient if said release condition has not been satisfied after a predetermined amount of time.

15. The method of claim 12, wherein said collaborative environment comprises a social networking service and said information comprises a post to said social networking service.

16. The method of claim 12, wherein said collaborative environment comprises an email service and said information comprises an email message to a list of email recipients.

17. A system, comprising:

a processor; and a memory communicatively coupled to said processor; said memory comprising executable code stored thereon such that said processor, upon executing said executable code, is configured to:

receive from a first user of said collaborative environment a pipeline condition corresponding to a target recipient and a release condition corresponding to said target recipient;

prevent said target recipient from accessing information satisfying said pipeline condition posted by said first user to said collaborative environment until said release condition has been satisfied; and allow users of said collaborative environment other than said target recipient to access said information satisfying said pipeline condition posted by said first user to said collaborative environment prior to said release condition being satisfied.

18. The system of claim 17, wherein said processor is configured to communicate with said first user and said target recipient through a computer network.

19. The system of claim 17, wherein said processor is further configured to store said information satisfying said pipeline condition posted by said first user to said collaborative environment in a queue preserving an order in which said information is posted by said first user to said collaborative environment.

20. The system of claim 17, wherein said processor is further configured to release said information satisfying said pipeline condition posted by said first user to said collaborative environment from said queue to said target recipient when said release condition has been satisfied, said information being released from said queue in the same order that said information was posted by said first user to said collaborative environment.

21. A system, comprising:
a processor; and
a memory communicatively coupled to said processor said memory comprising executable code stored thereon such that said processor, upon executing said executable code, is configured to:
   receive from a first user of said collaborative environment a pipeline condition corresponding to a target recipient and a release condition corresponding to said target recipient;
   prevent said target recipient from accessing information satisfying said pipeline condition posted by said first user to said collaborative environment until said release condition, has been satisfied;
   determine that information posted by a second user to said collaborative environment references said information satisfying said pipeline condition posted by said first user to said collaborative environment; and
   prevent said target recipient from accessing said information posted by said second user to said collaborative environment until said release condition has been satisfied.

22. The system of claim 17, wherein said processor is further configured to subject said release condition to an expiration such that said target recipient receives access to said information satisfying said pipeline condition posted by said first user to said collaborative environment if said release condition has not been satisfied after a predetermined amount of time.

23. A computer program product for selectively controlling information flow in a collaborative environment, the computer program product comprising:
a computer readable storage medium having computer readable program code embodied therewith, the computer readable program code comprising:
   computer readable program code configured to receive from a first user of said collaborative environment a pipeline condition corresponding to a target recipient and a release condition corresponding to said target recipient;
   computer readable program code configured to prevent said target recipient from accessing information satisfying said pipeline condition posted by said first user to said collaborative environment until said release condition has been satisfied; and
   computer readable program code configured to allow users of said collaborative environment other than said target recipient to access said information satisfying said pipeline condition posted by said first user to said collaborative environment prior to said release condition being satisfied.

24. The system of claim 17, wherein said release condition expires after a predetermined amount of time, said system then making said information available to said target recipient upon expiration of said release condition if said release condition was not previously satisfied.

25. The system of claim 17, wherein said system is further configured to accept different constraints for different types of information postings that satisfy the pipeline condition.

26. The system of claim 17, wherein said release condition may specify that said information is to be withheld from said target recipient indefinitely.

* * * * *